United States Patent Office

3,431,400
Patented Mar. 4, 1969

3,431,400
AUTOMATIC BREAD TOASTER
Takahiko Iida, Tokyo, and Akio Nobata, Minoru Harasaki, and Hirashi Kumazawa, Gunma Prefecture, Japan, assignors to Mitsubishi Denki Kabushiki Kaisha, Tokyo, Japan
Filed Nov. 25, 1966, Ser. No. 597,061
Claims priority, application Japan, Dec. 3, 1965, 40/38,320, 40/38,321, 40/38,322, 40/38,323; Dec. 29, 1965, 40/108,035
U.S. Cl. 219—501            7 Claims
Int. Cl. H05b *1/02*

ABSTRACT OF THE DISCLOSURE

An automatic bread toaster is provided with an RC time constant controlling a toasting time. A capacitor in the RC circuit is charged from a rectified source through a heating element to a predetermined voltage to activate a triggering element at a rate determined by the time constant of the RC circuit. When the trigger element conducts a voltage is applied across the capacitor to a thyristor to trigger it to a conducting state. This causes energization of an electromagnetic coil to open a power switch to terminate the toasting operation. The time constant circuit may include a variable resistor, a negative coefficient thermistor or a fixed resistor providing a discharge time curve corresponding to the temperature reduction curve of the toaster.

---

The invention relates in general to an automatic bread toaster and more particularly to a control device for controlling a toasting time in such a toaster.

The conventional type of control devices referred to is of a mechanical construction ordinarily utilizing a bimetallic thermostat. The devices are disadvantageous in that the products as assembled have different operating characteristics which, in turn, are required to be compensated for through the subsequent mechanical adjustment of the various components thereof resulting in great labor and a long time required manufacturing them.

Accordingly, an object of the invention is to provide a new and improved automatic bread toaster including purely electrical means for controlling a toasting time in place of bimetal means or any other mechanically operating control means previously utilized whereby its manufacturing time greatly reduces.

Another object of the invention is to provide an automatic bread toaster including a new and improved control device capable to control a shade of brown color of slices of bread in extremely simple and stepless manner by operation of a rotary or slidable control knob or a push-button or the like.

A still further object of the invention is to provide an automatic bread toaster including a new and improved control device whereby in a series of different toasting operations, slices of bread are consistently toasted to have substantially the same shade of brown color without the necessity of controlling the shade of brown color for each batch.

Further another object of the invention is to reduce costs with which a control device for use in an automatic bread toaster controlling a toasting time can be manufactured.

Briefly, the invention accomplishes these and other objects and advantages by the provision of an automatic bread toaster comprising a power switch, toasting heater means serially connected to said power switch, and control means for controlling a toasting time, said control means comprising a thyristor operatively coupled in parallel relationship to said toasting heater means, said thyristor having a gate electrode, electromagnetic coil means serially connected to said thyristor and responsive to conduction of said thyristor to be energized to open said power switch, a trigger element having a breakover voltage and connected to said gate electrode of the thyristor to control firing of said thyristor, an RC time constant circuit means including at least a variable resistor and a capacitor, both connected to said trigger element at the other end, said RC time constant circuit means having a time constant settable to a predetermined magnitude, the arrangement being such that a voltage across said capacitor reaching said breakover voltage of said trigger element causes actuation of said trigger element and said thyristor to energize said electromagnetic coil mean to open said power switch.

In a preferred embodiment of the invention said time constant circuit means may include a negative coefficient thermistor exhibiting the property that its magnitude of resistance decreases with an increase in temperature. When the voltage across the capacitor reaches a breakover voltage of a PNPN switching diode used as said trigger element the latter switches to its conducting state to render the thyristor conducting.

The trigger element may conveniently be a transistor, a voltage regulator tube or the like.

Also instead of the negative coefficient thermistor, said capacitor may have connected across both ends a discharge circuit including a resistor whose resistances is selected to cause the discharge-time curve for said capacitor to correspond substantially to the temperature reduction curve for the region of said toasting heater means or a toasting chamber.

The invention as to its organization and its method of operation as well as additional objects and advantages thereof will be better understood from the following detailed description, when taken, in conjunction with the accompanying drawings in which.

Throughout several figures, like reference numerals designate the corresponding or similar components.

Figure 1:
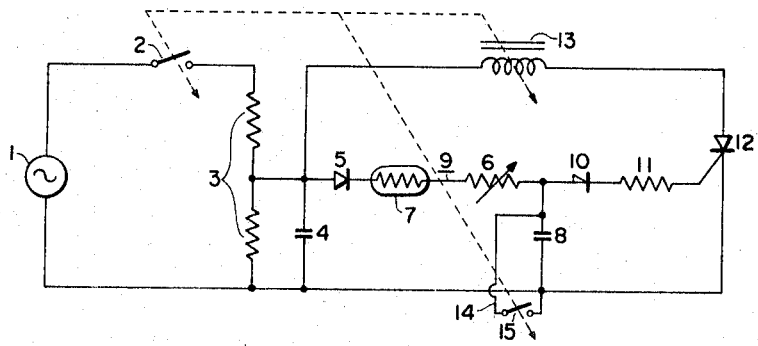
FIG. 1 is a schematic circuit diagram of an automatic bread toaster constructed in accordance with the teachings of the invention.

Referring now to the drawings and FIG. 1 in particular, there is illustrated an electrical circuit of an automatic bread toaster constructed in accordance with the teachings of the invention. A source 1 of alternating current having the commercial frequency can be connected through a normally open power switch 2 across a pair of toasting heaters 3 and 3 serially connected to each other. The switch 2 is of a conventional design and is controlled by a vertically movable bread carriage (not shown) in the conventional manner.

The lower heater 3 as viewed in FIG. 1 has shunted across the same a capacitor 4 for absorbing any surge voltage. The junction between the capacitor 4 and the lower heater 3 or the upper heater 3 is connected to a rectifier diode 5 connected to a variable resistor 6 through a negative coefficient thermistor 7 exhibiting the property that its magnitude of resistance decreases as its temperature rises. The thermistor 7 is suitably disposed within a toasting chamber (not shown) to be responsible to the temperature of the chamber to change the magnitude of resistance.

The variable resistor 6 is adapted to be adjusted in resistance by a manually operated shade control knob (not shown) disposed on the outside of a toaster's housing (not shown) so as to suit a shade of brown color exhibited by toasted slices of bread to a taste of the particular operator. Such a knob may be of any suitable type such as a rotary, a slidable or a push-button type. The variable resistor 6 is connected to one side of a capacitor 8 having the other side connected to the junction between the lower heater 3 and the capacitor 4. Thus the resistor 6 forms an RC time constant network with a series resistance 9 consisting of the resistances of the thermistor 7 and variable resistor 6 and is adapted to be charged with a unidirectional voltage provided by the rectifier diode 5 through the series resistance 9. Connected to the junction between the variable resistor 6 and the capacitor 8 is a semiconductor switching element such as a PNPN switching diode 10 which, in turn, is connected through a current limiting resistor 11 to a thyristor 12 at its gate electrode. The thyristor 12 has its cathode electrode connected to the lower end of the lower heater 3 and its anode electrode connected to an electromagnetic coil 13 connected to the junction between the upper and lower heaters 3 and 3. When energized, the electromagnetic coil 13 permits the bread carriage to raise thereby to open the switch 2 while at the same completing a discharge network 14 for the capacitor 8 through closing of a normally open switch 15 in the network 14.

The arrangement as above described is operated as follows: It is now assumed that the shade control knob as previously described has been preset to its position where a shade of brown color exhibited by toasted slice or slices of bread suits to a taste of the particular operator. Under these circumstances, a slice or slices of bread to be toasted can be first placed on the bread carriage as previously described and then the carrige is lowered to its predetermined position to close the switch 2 in the conventional manner. This closing of the switch 2 causes a current to flow from the source 1 through the serially connected heaters 3 and 3 to initiate to toast the slice or slices of bread in the same manner as in the conventional type of automatic bread toasters.

Simultaneously, a current from the junction between the toasting heaters 3 and 3 into the rectifier diode 5 which provides a rectified unidirectional current. Then the unidirectional current flows through the series resistance 9 into the capacitor 8 to charge it. Thus a voltage across the capacitor 8 increases at a rate determined by the time constant of the RC time constant network 7, 6 and 8 or proportional to a product of the magnitude of the series resistance 9 multiplied by the magnitude of capacity of the capacitor 8 until the voltage reaches the breakover voltage of the switching diode 10 as shown at curve $a$ in FIG. 2 wherein the charging voltage across the capacitor 8 is plotted as a function of time. When this occurs, the switching diode 10 becomes conducting to permit the voltage across the capacitor 8 to be applied through the resistor 11 to the gate electrode of the thyristor 12 to trigger the latter to its conducing state.

When the thyristor 12 is brought into its conducting state, the capacitor 8 is discharged through the now conducting diode 10, the resistor 11 and the gate-to-cathode electrodes of the thyristor 12 while at the same the electromagnetic coil 13 is energized by the source 1. When energized, the coil 13 permits the bread carriage to ascend thereby to open the switch 2 whereupon the toasting operation ceases except for toasting due to heat left on the heaters and in the toasting chamber. The energized coil 13 also closes the switch 15 to discharge fully the capacitor 8 to be ready for the subsequent operation. Thus toasting the slice or slices of breads has or have been completed.

From the foregoing it will be appreciated that the toasting time is determined by the time constant of the RC network comprising the thermistor 7, the variable resistor 6 and the capacitor 8 and variable at will through control of the resistance of the variable resistor 6 by adjustment of the shade control knob not shown.

It is well known that if it is desired to toast continuously slices of bread in several toasting operations, as compared with a first toasting time, a second and subsequent toasting times should be progressively shorter in order for the toasted slices of bread to exhibit the substantially same shade of brown color for the respective operations or the respective batches. This is because the toasting chamber has been warm through the previous toasting operation.

In order to eliminate the necessity of separately controlling the toasting time for each batch, the negative coefficient thermistor 7 has been provided with the toasting chamber to be responsive to the temperature of the chamber to decrease its resistance with an increase in temperature. A decrease in resistance of the thermistor 7 reduces the time constant of the RC network 7, 6 and 8 thereby to decrease the toasting time.

Figure 2:
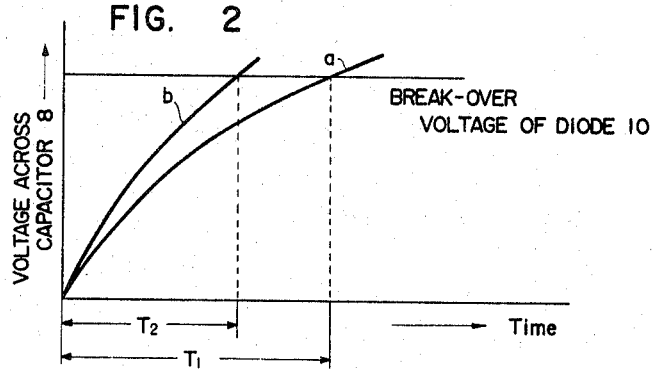
FIG. 2 is a graph illustrating a voltage across a capacitor shown in FIG. 1 plotted as a function of time.

For example, it is assumed that the charging voltage on the capacitor 8 has reached the breakover voltage of the PNPN switching diode 10 (FIG. 1) at a time $T_1$ after initiation of the toasting operation as shown at crossing of curve $a$ with a horizontal line in FIG. 2. Just before the second toasting operation, the toasting chamber has been warm through the first operation and therefore the thermistor 7 correspondingly decreases in resistance resulting in a decrease in time constant of the RC network 7, 9, 6 and 8. Therefore in the second toasting operation the voltage across the capacitor 8 will reach the breakover voltage of the diode 10 in a time interval $T_2$ less than that $T_1$ in the first operation as shown at curve $b$ in FIG. 2.

In the arrangement shown in FIG. 1, the control circuit of the invention is connected to the junction between the pair of serially connected toasting heaters 3 and 3. This leads to an advantage that the various components of the control circuit may have the low voltage ratings resulting in the automatic bread toaster being manufactured at low costs. However it is to be understood that in practicing the invention any desired number of toasting heaters disposed in series or parallel circuit relationship may be used with the control circuit connected to any desired intermediate point on the heater circuit.

While the invention has been described in terms of the control circuit including the PNPN switching diode 10 for triggering the thyristor 12 it is to be understood that instead of the PNPN switching diode 10, any suitable switching element such as a transistor, a voltage regulator tube or the like may be used with satisfactory results.

Figure 3:
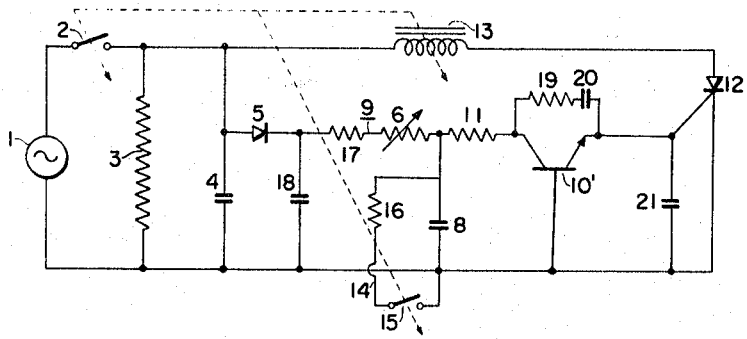
FIG. 3 is a schematic circuit diagram of a modification of the invention.
Figure 5:
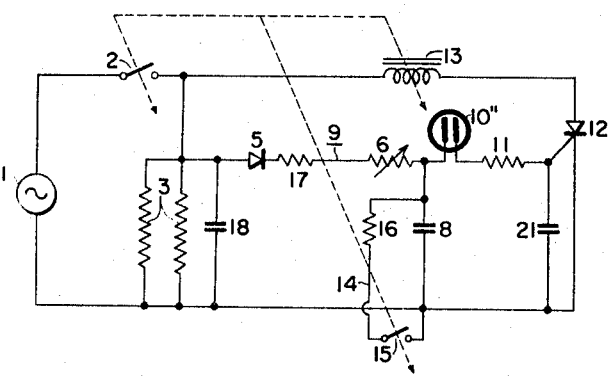
FIG. 5 is a schematic circuit diagram of another modification of the invention.

FIG. 3 illustrates a transistor 10′ for triggering a thyristor 12 with a protective resistor 19 and a surge absorbing capacitor 20 for preventing any malfunction of the transistor being connected across the collector and emitter electrodes thereof. On the other hand, FIG. 5 illustrates a voltage regulator tube 10″ for the same purpose as the diode 10 shown in FIG. 1. It will be readily apparent that as in FIG. 1, the transistor 10′ or the voltage regulator tube 10″ is fired at the instant charging voltage on a capacitor 8 reaches either the breakdown voltage of the transistor 10′ or the firing voltage of the tube 10″ in a time interval determined by a time constant of an RC network comprising a fixed resistor 17, a variable resistor 6 and the capacitor 8 with the result that the thyristor 12 is triggered to its conducting state.

Further a rectifier diode 5 shown in FIG. 5 is associated with a smoothing capacitor 18 and the thyristor 12 shown in each of FIGS. 3 and 5 has associated therewith a surge absorbing capacitor 12 for preventing any malfunction thereof. Unlike FIG. 1, the present control circuit illustrated in each of FIGS. 3 and 5 is connected to the junction between a power switch 2 and a single toasting heater 3 (FIG. 3) or a pair of parallel toasting heaters 3 (FIG. 5). In other respects the arrangements illustrated in FIGS. 3 and 5 are substantially identical to that shown in FIG. 1 except for means for imparting the substantially same shade of brown color exhibited by a slice or slices of bread toasted through separated ones of a series of toasting operations which will be subsequently described.

As previously described, the second and subsequent toasting times should be progressively shorter as compared with the first toasting time in order that the toasted slice of bread for respective batches can exhibit substantially the same shade of brown color. To this end, the arrangements illustrated in FIGS. 3 and 5 includes a fixed resistor 17 in place of the negative coefficient thermistor 7 (FIG. 1) and a resistor 16 connected in a discharge circuit 14 for the capacitor 8.

The resistor 16 has its resistance such that the discharge-time curve for the capacitor 8 substantially corresponds to the temperature reduction curve for the toasting chamber.

Figure 4:
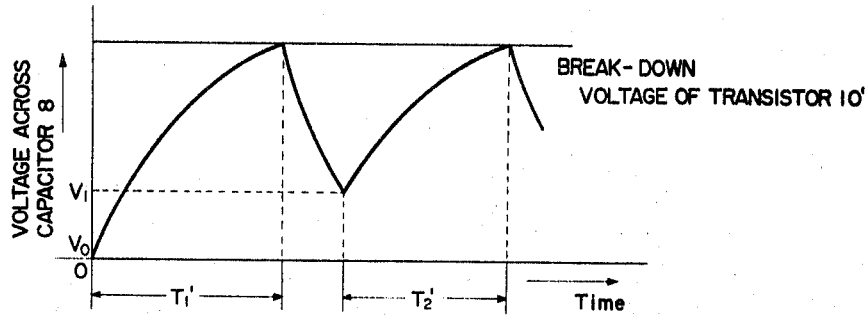
FIG. 4 is a view similar to FIG. 2 but obtained with the arrangement illustrated in FIG. 3.

In FIG. 4 wherein a charging voltage on the capacitor 8 is plotted as a function of time, it is assumed that for a first toasting operation, the voltage across the capacitor 8 has reached the breakdown or firing voltage respectively of the transistor 10' or the voltage regulator tube 10'' in a time interval $T'_1$ after the initiation of the toasting operation. At the instant the second toasting operation is started, the voltage across the capacitor 8 is higher by $V_1$ volts than that just before the first toasting operation was started because the resistor 16 controlled an amount of charge discharged from the capacitor 8. Therefore it will be appreciated that a charging time for the capacitor 8 or a time interval during which it is charged to a predetermined voltage or the breakdown or firing voltage respectively of the transistor 10' or the voltage regulator tube 10'' for the second toasting operation is automatically shorter than that for the first operation with the result that the second batch is substantially identical in shade of brown color to the first batch.

The invention has several advantages. For example, a period of time for which the products as assembled are adjusted in operating characteristics greatly reduces as compared with the case where a bimetallic therostat is used. The shade of brown color exhibited by a toasted slice or slices of bread can be controlled in simple, positive and stepless manner only by changing the variable resistance through easy operation of the shade control knob. Further, if it is desired to toast continuously slices of bread in a series of different operations, they can exhibit consistently the substantially same shade of brown color. In addition the present control circuit is composed of inexpensive components of low voltage ratings.

While the invention has been shown and described with reference to certain preferred embodiments thereof it is to be understood that various changes in the details of construction and the combination and arrangement of parts may be resorted to without departing from the spirit and scope of the invention.

What we claim is:

1. An automatic bread toaster comprising a power switch, toasting heater means serially connected to said power switch, and control means for controlling a toasting time, said control means comprising a thyristor operatively coupled in parallel relationship to said toasting heater means, said thyristor having a gate electrode, electromagnetic coil means serially connected to said thyristor and responsive to conduction of said thyristor to be energized to open said power switch, a trigger element having a breakover voltage and connected to said gate electrode of the thyristor to control firing of said thyristor, an RC time constant circuit means including at least a variable resistor and a capacitor, both connected to said trigger element at the other end, said RC time constant circuit means having a time constant settable to a predetermined magnitude, the arrangement being such that a voltage across said capacitor reaching said breakover voltage of said trigger element causes actuation of said trigger element and said thyristor to energize said electromagnetic coil means to open said power switch.

2. An automatic bread toaster as claimed in claim 1, wherein said trigger element is a PNPN switching diode.

3. An automatic bread toaster as claimed in claim 1, wherein said trigger element is a transistor.

4. An automatic bread toaster as claimed in claim 1, wherein said trigger element is a voltage regulator tube.

5. An automatic bread toaster as claimed in claim 1, wherein said capacitor has connected across both ends a discharge circuit including a normally open switch responsive to energization of said electromagnetic coil mean at the end of the toasting time to be open, and wherein said variable resistor having serially connected thereto a negative coefficient thermistor exhibiting the property that its resistance decreases with an increase in temperature, said thermistor being put under the influence of heat generated by said toasting heater means such that when slices of bread are continuously toasted in a series of different toasting operations, the toasting times in the different toasting operation are automatically adjusted to impart the substantially same shade of brown color to the slices of bread toasted in the different toasting operation.

6. An automatic bread toaster as claimed in claim 1, wherein said capacitor has connected across both ends a discharge circuit including a resistor having such a resistance that the discharge-time curve for said capacitor substantially corresponds to the temperature reduction curve for the region of said toasting heater means whereby when slices of bread are continuously toasted in a series of different toasting operations, the toasting times in the different toasting operation are automatically adjusted to impart the substantially same shade of brown color to the slices of bread toasted in the different toasting operation.

7. An automatic bread toaster comprising a power switch, toasting heater means serially connected to said power switch, a voltage dividing terminal disposed on said toasting heater means, and control means for controlling a toasting time, said control means comprising a thyristor operatively coupled in parallel circuit relationship to a portion of said toasting heater means, said thyristor having a gate electrode, electromagnetic coil means serially connected to said thyristor and responsive to conduction of said thyristor to be energized to open said power switch, a trigger element having a breakover voltage and connected to said gate electrode of the thyristor to control firing of said thyrisor, an RC time constant circuit means including at least a variable resistor and a capacitor, both connected to said trigger element at the other end, said RC time constant circuit means having a time constant settable to a predetermined magnitude, the arrangement being such that a voltage across said capacitor reaching said breakover voltage of said trigger element causes actuation of said trigger element and said thyristor to energize said electromagnetic coil means to open said power switch.

References Cited

UNITED STATES PATENTS

| | | | |
|---|---|---|---|
| 3,149,224 | 9/1964 | Horne et al. | 219—501 |
| 3,211,214 | 10/1965 | Chambers | 219—501 |
| 3,254,838 | 6/1966 | Chambers | 219—501 |

BERNARD A. GILHEANY, *Primary Examiner.*

F. E. BELL, *Assistant Examiner.*

U.S. Cl. X.R.

219—505